INVENTOR.
JOHN T. SABOL
BY ALFRED C. BODY
Alfred C Body
ATTORNEY

June 23, 1953

A. C. BODY ET AL 2,643,325

PROGRESSIVE HIGH-FREQUENCY HEATING
OF VARIABLE-DIMENSION SHAFTS

Filed Oct. 6, 1950

INVENTOR.
JOHN T. SABOL
BY ALFRED C. BODY

*Alfred C Body*

ATTORNEY

June 23, 1953

A. C. BODY ET AL 2,643,325

PROGRESSIVE HIGH-FREQUENCY HEATING
OF VARIABLE-DIMENSION SHAFTS

Filed Oct. 6, 1950

INVENTOR.
JOHN T. SABOL
BY ALFRED C. BODY

Alfred C Body

ATTORNEY

Patented June 23, 1953

2,643,325

UNITED STATES PATENT OFFICE 2,643,325

PROGRESSIVE HIGH-FREQUENCY HEATING OF VARIABLE-DIMENSION SHAFTS

Alfred C. Body and John T. Sabol, Cleveland, Ohio, assignors to The Ohio Crankshaft Company, Cleveland, Ohio, a corporation of Ohio Application October 6, 1950, Serial No. 188,857

10 Claims. (Cl. 219—47)

This invention pertains to the art of high-frequency induction heating and, more particularly, to the progressive heating of variable-diameter shafts.

The invention is particularly adapted to the progressive heat treatment of axle shafts as used on automobiles and will be described with particular reference to such an application, although it will be appreciated that the invention has many other broader applications. Axle shafts as used for automobiles are normally continuously tapered from one end to the other, the large end of some having a large gear integrally formed therewith.

With axle shafts of the type referred to, it has heretofore been conventional to surround the axle shaft with a single or multiple-turn, high-frequency inductor and progressively advance the inductor along the shaft from the gear or large-diameter end toward the small-diameter end. The inductor has a fixed internal diameter and as it is progressed along the shaft, the electrical coupling of the inductor with the shaft gradually decreases so that the electric power transferred to the shaft goes down. In order to obtain the same depth of heating, it is necessary to either increase the power to the inductor or to slow down its rate of movement or both. With the former situation, the high-frequency power source will have a poor power demand factor and will operate at its maximum demand value for only a portion of the time. With the second method, the total heating time may become unduly long.

In the past, it has been proposed to employ an inductor constructed on the idea of an accordion; that is, the inductor is constructed in a plurality of jointed or telescoping pieces so that the diameter of the bore may be decreased along with the decrease in diameter of the shaft. Such inductors have generally been unsuccessful. The electric currents are so high as to make jointed construction difficult. Also, such an inductor ordinarily provides an uneven heat pattern and has poor electrical efficiency.

It has also been proposed to employ a plurality of inductors positioned along the shaft, each inductor having an internal bore diameter such as to efficiently heat the shaft for the portion of the shaft along which it is progressed. However, such an arrangement ordinarily requires a plurality of transformers, switches and other additional equipment such as power-factor adjusting condensers and the like.

The present invention attempts to overcome all of the above difficulties and contemplates an inductor arrangement and method of progressive high-frequency induction heating which enables one high-frequency inductor to be employed for progressively heating the whole length of the shaft with efficient power matching at the small-diameter end of the shaft as well as at the larger-diameter end of the shaft.

In accordance with the present invention, a high-frequency inductor is employed in combination with a concentrator which will improve the electrical coupling of the inductor to the shaft as the diameter of the shaft decreases. The high-frequency inductor is so constructed and arranged such as to efficiently couple with the shaft at the larger-diameter end and this inductor is progressed relatively along the shaft in a conventional manner. At some predetermined point or points in the movement of the inductor along the shaft, the concentrator is relatively moved into cooperative relationship with the inductor to provide the necessary and desired increased coupling with the smaller-diameter portions of the shaft, and the concentrator thereafter generally moves along with the inductor.

In accordance with a preferred embodiment of the invention, the high-frequency inductor may be of relatively conventional construction comprised of a C-shaped conductor, split at one point, defining a workpiece-receiving opening of a size such as to efficiently couple with the shaft at the larger-diameter end. Electrical connections to a power source are made to the conductor on each side of the split. The concentrator is comprised of a generally C-shaped conductor, split at one point, defining a work-piece-receiving opening of a diameter generally less than that of the inductor and such as to efficiently couple with the smaller-diameter portions of the shaft. No electrical connections need be made to the concentrator ring. When in operative position with the inductor, the effect of the concentrator is to change the electrical characteristics of the inductor so that it performs when opposite the smaller-diameter portions of the shaft as though the inductor actually had a workpiece-receiving opening designed to couple with these smaller-diameter portions.

This concentrator may or may not nest or extend into the bore of the inductor and may or may not make electrical contact therewith. If it should make electrical contact with the principal inductor, then the gap of the concentrator must coincide exactly with the gap of the principal inductor. In a more preferred embodiment of the invention, however, the concentrator is insulated from the principal inductor so that the relative location of the gap of the ring and the principal inductor becomes unimportant. Any currents flowing in the concentrator flow therein as a result of transformer action or induction. The split of the concentrator prevents it from acting as a shorted turn on the inductor. The effect of the concentrator is to increase the electric coupling of the inductor to the workpiece, the same as though its workpiece opening were altered to more closely fit the workpiece. It is normally intended that the concentrator will be relatively moved into operative relationship with the inductor at a predetermined point or points along the shafts. In some instances, the concentrator may be progressively moved along the shaft, but at a slower rate than the principal inductor so as to provide an effective gradual reduction in the effective bore of the inductor so that the power input to the workpiece may always remain constant. In other instances, the relative position of the concentrator to the inductor may be controlled by employing means sensitive to power input to the inductor to position the concentrator relative to the inductor to maintain the power input to the inductor at generally constant levels or between predetermined limits.

The concentrator may assume a number of different forms. It may be a C-shaped conductor constructed preferably so that a minimum of leakage reactance between the principal inductor and the concentrator results. This involves a thin layer of electrical insulation and a maximum area overlap of the two elements. The concentrator may comprise a pair of semicircular conductors mounted for radial movement as they are progressed axially along the shaft, the radial movement being a function of the shaft diameter. The concentrator may be formed of magnetically-permeable material. In such a case, a stack of thin laminations should be used. Also, the concentrator in this instance should not extend into the workpiece opening of the inductor.

The principal object of the invention is the provision of new and improved high-frequency induction-heating apparatus for progressively heating a variable-diameter shaft or the like which is simple in construction and operation, which provides a maximum of electrical efficiency over the entire length of the shaft and which is relatively inexpensive to construct.

Another object of the invention is the provision of a new and improved induction apparatus for progressively heating a variable-diameter shaft or the like with good electric coupling over the entire length which comprises an inductor designed for efficient electrical coupling with the larger-diameter portions of the shaft, a concentrator for increasing the coupling for the smaller portions of the shaft and means for progressively moving the inductor relatively along the shaft and the concentrator into operative relationship therewith at a predetermined point in the movement.

Still another object of the invention is the provision of new and improved apparatus for progressively heating variable-dimensioned shafts or the like which includes a principal inductor having a split adapted to be progressed along the length of the shaft and a concentrator in the shape of a ring also having a split adapted to move along portions of the length of the shaft with the principal inductor and so arranged that the ring need not electrically contact the principal inductor and so that the splits need not be aligned.

Yet another object of the invention is the provision of new and improved apparatus for maintaining generally constant the power input to an inductor which is progressively heating a variable-dimensioned shaft, which includes an inductor designed for efficient electrical coupling with the large-dimensioned portions of the shaft and a concentrator adapted to be relatively moved into cooperative relationship with the inductor to increase its electrical coupling, means for progressively moving the inductor along the shaft and means sensitive to the power input to the inductor to operatively position the concentrator relative to the inductor so as to maintain the power input to the inductor generally constant or within predetermined limits.

Another object of the invention is the provision of a new and improved combination of an inductor adapted to be progressively moved along a variable-dimensioned shaft and a concentrator for increasing the coupling of the inductor to the shaft as the diameter of the shaft decreases during the progressive movement, the concentrator being so designed as to readily nest within the workpiece-receiving opening of the inductor in insulated relationship therewith and with a minimum amount of leakage reactance.

The invention may be comprised in certain parts and arrangement of parts, a preferred embodiment of which will be described in detail in this specification and illustrated in the accompanying drawing which is a part hereof, and wherein.

Figure 1:
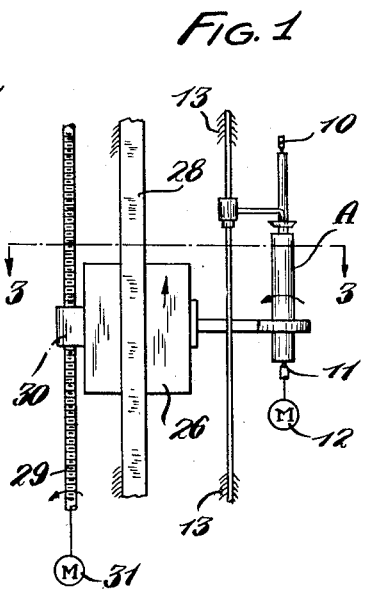
Figure 1 is a fragmentary, somewhat schematic, side elevational view of high-frequency induction-heating apparatus, including an inductor and concentrator for progressively heating a variable-diameter shaft and embodying the present invention.

Referring now to the drawings wherein the embodiments shown are for the purposes of illustrating the invention only and not for the purposes of limiting its scope, Figure 1 shows the invention as applied to the progressive heating of an elongated shaft A supported for rotation on its axis by centers 10, 11 rotatably mounted on a base 13 shown schematically. A motor 12 is shown schematically as connected to the lower center for rotating the centers and shaft. The shaft A may take any conventional shape but is shown as having a shoulder 14 midway along its length providing a lower portion 15 of large diameter and an upper portion 16 of much lesser diameter. The shaft may take other shapes and the outlines of a continuously-tapered shaft are shown in dotted lines. The shaft A is shown surrounded by a principal high-frequency inductor B having an internal workpiece-receiving opening 20 of a diameter at least somewhat greater than the maximum diameter of the shaft A which must be heated thereby. This inductor is relatively conventional in construction and is comprised of a C-shaped loop of a conductor with the ends spaced and insulated as at 21 and connected to a pair of parallel, close-spaced, fish-tail leads 23, 24.

The fish-tail leads 23, 24 connect to the terminals of an impedance-matching transformer 26, which transformer is, in turn, connected to a high-frequency power source 25 through suitable power leads 22. As shown, the transformer 26 has slides 27 which move in vertical guideways 28 having an axis parallel to the shaft. A threaded shaft 29 rotated by a motor 31 engages in a threaded sleeve 30 fixed to the back of the transformer and progressively moves the transformer along the axis of the shaft. The inductor B is supported by the transformer and moves along therewith to progressively heat the shaft from the lower or large-diameter end 15 towards the upper or small-diameter end 16.

The inductor B is of a generally hollow construction and the workpiece-receiving opening 20 is defined by a downwardly and inwardly-tapering wall 35 which extends for about two-thirds of the axial width of the inductor; and then for the remaining third of the width of the inductor, the workpiece opening is defined by a downwardly and outwardly-tapering surface 36. As stated, the inductor is generally of hollow construction and has a pair of internal passages, an upper passage 38 defined on its inner side by the wall 35 and a lower passage 39 defined on its inner side by the wall 36.

The passage 38 is for the purpose of flowing cooling water through the inductor. The passage 39 is for the purpose of supplying quench water and, for this purpose, the wall 36 is provided with a plurality of downwardly and inwardly-directed openings 41 through which quench water under pressure may be projected against the shaft A. Plumbing connections as are conventional and not shown supply the necessary water to the passages.

As it will be seen from the drawings, the diameter of the opening 20 of the inductor B is approximately the same or just slightly larger than the external diameter of the larger portion 15 of the shaft A. Thus, as the inductor B is progressed upwardly along the shaft, reasonably good electrical coupling will result with the shaft until the inductor reaches the shoulder 14, at which time the spacing between the inductor and the shaft A will increase materially with the result that the electrical coupling between the inductor and the shaft will radically decrease.

At this point in the progressive movement of the inductor, the power input to the inductor will go down along with the efficiency of the energy transfer to the workpiece. Both of these factors act in a cumulative manner to cut down the rate of heating. Even if the power input to the inductor were again brought back to the original amount because of the lower efficiency of the electrical coupling, the power input to the workpiece would still be lower than before.

A concentrator D is provided for the purpose of increasing the coupling of the inductor B with the shaft A after the inductor passes the shoulder 14. In the embodiment shown, the concentrator is generally in the shape of a ring and comprises a generally C-shaped hollow conductor having the ends in close-spaced insulated relationship forming a split 45. The outer radial surface of the ring preferably tapers downwardly and inwardly at the same angle as the surface 35 of the inductor B and is covered with a layer of insulation 46, the external diameter of the ring with the insulation being generally the same as the diameter of the opening 20 as defined by the surface 35. With such a construction, it will be seen that the concentrator can nestle or telescope into the workpiece-receiving opening of the inductor B.

The concentrator D has an internal workpiece-receiving opening 49 just slightly greater than the maximum diameter of the portion 16 of the shaft A and is supported in position just above the shoulder 14 by bracket arms 50 attached to sleeves 51 slidable in a vertical direction parallel to the axis of the shaft A by guide rods 52. Stops 53 are clamped to the guide rods 52 to adjust the lowermost vertical position of the concentrator D relative to the shoulder 14.

In the embodiment shown, the concentrator ring D is freely slidable in a vertical direction on the rod 52 above the stops 53. Thus, as the inductor B is progressed upwardly along the shaft A, it picks up the concentrator D and carries it along with it for the remainder of its travel.

The concentrator ring D is generally of hollow construction in order that it may be water cooled and suitable water-cooling connections 55 are provided for circulating the cooling water into the ring and out of the ring immediately adjacent both sides of the split 45.

Figure 4:
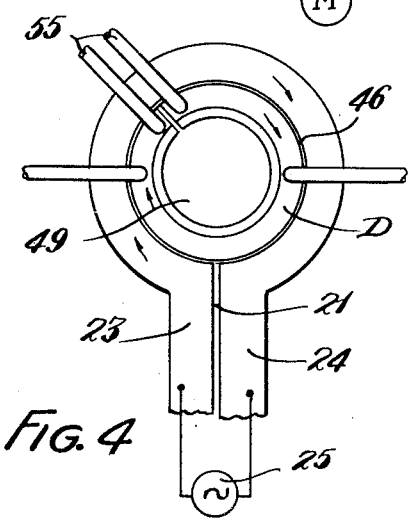
Figure 4 is an enlarged top elevational view of the inductor and concentrator in nestled relationship.
Figure 5:
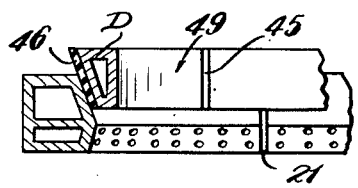
Figure 5 is a cross-sectional view of Figure 4 taken approximately on the line 5—5 thereof.

In the arrangement shown, alignment of the split 45 with the split of the inductor B is unimportant. The concentrator is insulated from the inductor B by the thin layer of insulation. Thus, the indicator B will induce currents to flow in the concentrator ring generally as shown by the plus and minus signs of Figure 2, where the elements are shown by dotted lines in nestled relationship, and by the arrows of Figure 4.

The wall 35 is shown as tapering downwardly and inwardly which, in some respects, will tend to concentrate and give the maximum amount of heating immediately opposite the sharp corner formed by the meeting of the two tapered surfaces 35 and 36. In addition, the tapering of the surface 35 as shown facilitates the alignment of the concentrator D with the inductor B when two come into nestling or operative relationship.

It is desired that the insulating layer 46 be as thin as possible in order to reduce the leakage reactance between the inductor B and the concentrator D. Thus, the concentrator ring D will force substantially all of the flux of the inductor B to flow through its workpiece-receiving opening and, thus, magnetically couple the inductor B with the shaft A.

If the shaft A has more than the one shoulder shown or if it has a very large degree of taper from one end to the other, it will be appreciated that more than one concentrator could be employed, each positioned axially along the shaft at some predetermined point to progressively come into operative relationship and maintain the coupling of the inductor with the workpiece generally constant or variable over a minimum range.

Figure 6:
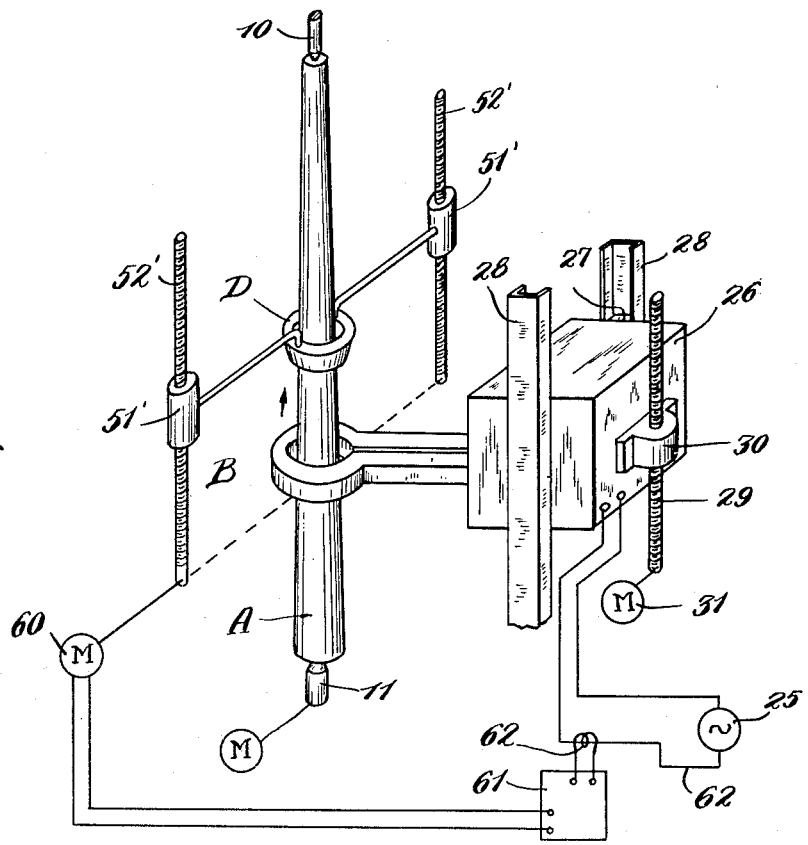
Figure 6 is a perspective view somewhat similar to Figures 1 and 2 but showing a modification of the invention wherein the position of the concentrator relative to the inductor is controlled by the power input to the inductor.

Figure 6 shows a modification of the preferred embodiment shown in Figures 1 to 5. In this figure, the concentrator ring D is supported relative to the inductor B so that its position will be a function of the power input to the inductor B. In the figure, the part identical to those of Figures 1 to 5 have the same reference numerals while parts with similar functions have the same reference numeral with a prime mark added. Thus, in this embodiment of the invention, the concentrator D is supported for vertical movement on threaded sleeve 51' in which vertical lead screws 52' are threadably engaged. These lead screws are, in turn, rotated by a motor 60. Rotation of the lead screws 51' in one direction raises the concentrator D while rotation in the opposite direction lowers it, the rate of movement being dependent upon the speed of rotation of the motor 60. The speed of rotation of the motor 60 and its direction of rotation is a function of the power input of the inductor B and for this purpose, the motor 60 is energized through control apparatus 61, which apparatus is coupled by means of a coil 62 to the power leads 63 leading from the power source 25 to the transformer 26. Equipment which will react to a given amount of power flowing in an electric power line is well known and the apparatus is shown here schematically. Obviously, any well known type of control apparatus could be employed, either operating on the current flowing from the power source 25 or on the voltage, or on a combination of both.

As the inductor B is progressed along the shaft, the power input goes down. When the power reaches a predetermined value, the control 61 acts on the motor 60 to bring the concentrator D into operative position with the inductor B. As soon as the power reaches the predetermined point, the control acts to control the speed of the motor 60 to control the relative position of the concentrator D to the inductor B.

A further alternative arrangement of Figure 6 is possible. The motor 60 can drive the concentrator D along the shaft somewhat less than the rate of movement of the inductor B so that the concentrator comes into operative relationship with the inductor B in a progressive and gradual manner. When the concentrator is in full operative relationship, the speed of movement may be controlled by the speed of the inductor B. The actual mechanics necessary are all known to those skilled in the motor-control art and need not be detailed here.

Figure 2:
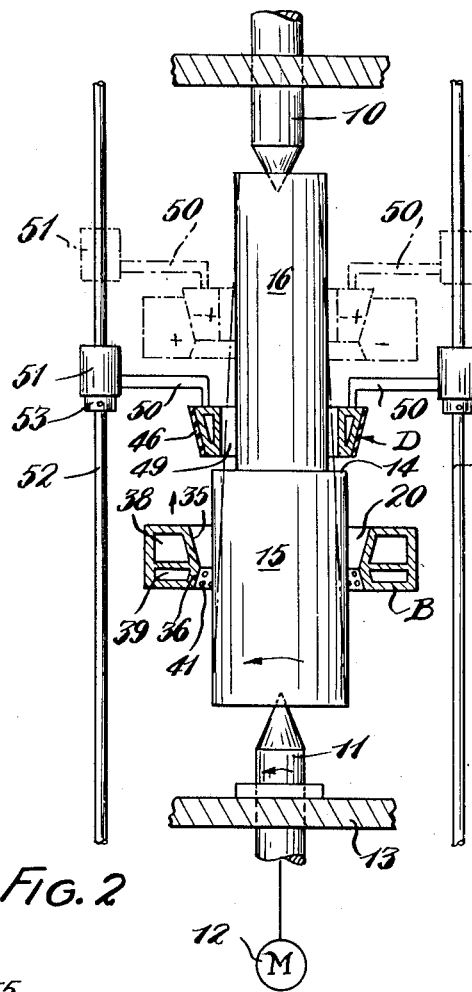
Figure 2 is a front elevational view of Figure 1 partly in section showing in dotted lines the inductor and concentrator in cooperative relationship.
Figure 3:
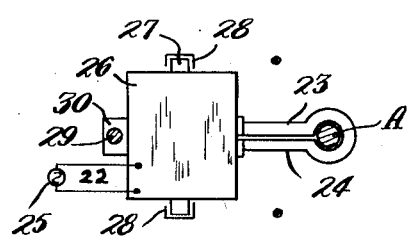
Figure 3 is a sectional view of Figure 1 taken approximately on the line 3—3 thereof.
Figure 7:
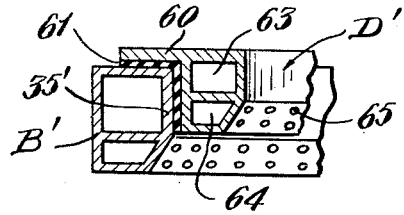
Figures 7 and 8 are views similar to Figure 5 but showing alternative constructions of the inductor and concentrator.

Figure 7 shows a slightly modified embodiment of the inductor shown in Figures 1, 2 and 3. Here, the wall 35' of the inductor B' extends parallel to the axis of the shaft A. This may be necessary in some cases to obtain the desired heat pattern on the large portion 15 of the shaft A. The concentrator ring D' generally has an external diameter somewhat less than the diameter of the opening formed by the wall 35' so that it may readily and easily nestle into this opening. The concentrator D' has an upper radially outwardly-extending flange 60 having a layer of insulation 61 on the lower surface of the flange. This flange 60 locates the concentrator ring D' relative to the inductor B' and the insulation 61 prevents electrical contact between the two rings.

Further, in the embodiment shown in Figure 7, the concentrator D' is provided with a pair of internal passages 63, 64. The upper passage 63 is for the purpose of cooling the ring D' while the lower passage 64 is a quench passage adapted to supply quenching fluid to a plurality of openings 65 opening to the inner surface of the ring D'. Suitable plumbing connections not shown would obviously have to be provided. Obviously, the concentrator D of the principal embodiment could be provided with a built-in quench.

In operation, the inductor B with the concentrator D nestled therein will, at the end of a hardening run, be adjacent the support 10. While in this position, a hardened shaft may be removed and a new shaft to be hardened may be placed in position by retracting one of the supports 10 as is conventional.

The transformer 26 carrying the inductor B is then rapidly lowered toward the lower and large end of the shaft A. The concentrator D rides down with the inductor B until the sleeves 51 strike the stops 53. The concentrator ring D remains at this position while the inductor B continues its downward travel. When the inductor B has reached the point where the hardening run is to commence, the inductor is energized and allowed to remain stationary until the lower end of the shaft has reached the hardening temperature. At this moment, the quench is turned on and the transformer with the conductor is progressed upwardly along the shaft, thus progressively hardening the end 15. When the inductor B reaches the position of the concentrator D, the concentrator will nestle into the inductor B and then the inductor will pick up and carry the concentrator vertically upwardly along the shaft as is shown by the dotted lines of Figure 1. The effect of the concentrator ring D is to increase the electrical coupling of the inductor B with the shaft beyond the shoulder 14 so that the power input to the shaft can remain at a relatively uniform power level. In this hardening operation, the shaft A is preferably continuously rotated by the motor 12.

The invention has been described with reference to a shaft having an abrupt shoulder. In many instances, the shaft may be continuously tapered, either uniformly or at varying range. If a tapered shaft were to be employed, the concentrator D would be positioned along the taper at the point where the heating rate of the inductor would normally fall off to an undesirable degree.

In some instances, suitable power means may be employed for advancing the concentrator ring D along the shaft, it being preferred in this instance that some form of differential gearing be employed so that the inductor B will actually move at a rate faster than the concentrator ring D. In this way, the rate of nestling of the concentrator ring D in the inductor B may be readily controlled and abrupt changes in the power input may be avoided.

The invention contemplates, as an alternative embodiment, using a concentrator ring without the insulation member 46 so that the concentrator ring will electrically contact with the inner surface of the inductor B. In such event, however, the split 45 of the concentrator ring would have to be exactly aligned with the split of the inductor B. Also, some form of clamping means would have to be provided to insure that good electrical contact would result between the inductor and the concentrator ring.

In all of the above embodiments, the concentrator has been described as having dimensions so that it may nest within the workpiece-receiving opening of the inductor. In some cases, this is not entirely necessary and the concentrator ring may have dimensions such that it will rest entirely on the top of the inductor B with the workpiece-receiving opening of the concentrator being somewhat smaller than the workpiece-receiving opening of the inductor.

The concentrator may also be formed in two semicircular-shaped conductors with the ends held in insulated relationship either by physical spacing or by electrical-insulating means. With such a construction, it will be appreciated that the concentrator may, in addition to being progressed axially along the shaft, be moved radially relative to the shaft so that the inductor and concentrator may be progressed along a shaft having a plurality of alternate large and small diameters, the concentrator being moved radially inwardly to increase the coupling at the small-diameter portions of the shaft and being moved radially outwardly to permit the concentrator to pass over the large-diameter portions of the shaft.

Figure 9:
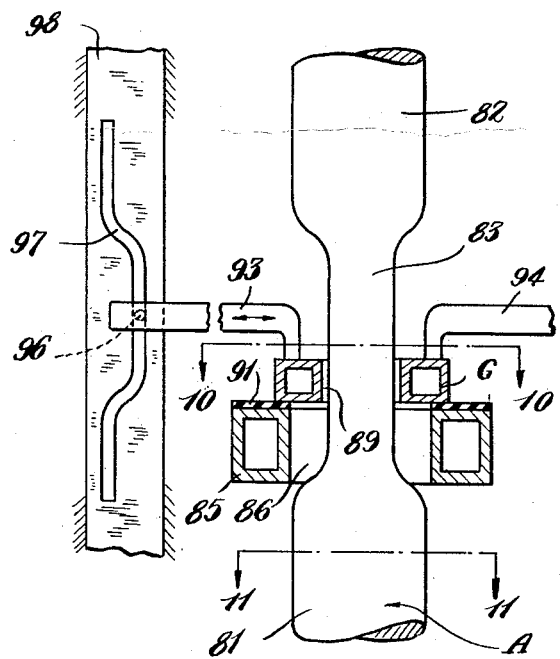
Figure 9 shows a further alternative arrangement of the invention wherein the concentrator is formed in segments for radial movement relative to the shaft as well as longitudinal movements.
Figure 10:
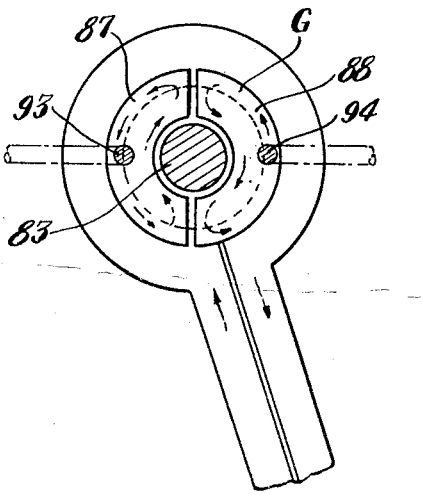
Figure 10 is a cross-sectional view of Figure 9 taken approximately on the line 10—10 thereof.
Figure 11:
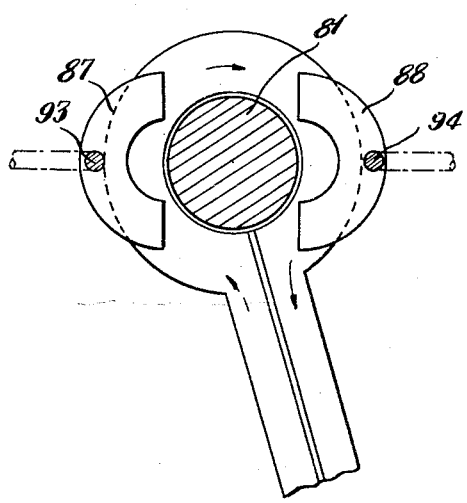
Figure 11 is a view similar to Figure 10 taken on the line 11—11 of Figure 9 and showing the relationship of the parts if the inductor were located immediately below the section line shown.

Such an arrangement is shown in Figures 9, 10 and 11. Figure 9 shows a shaft A' having enlarged lower and upper ends 81, 82 respectively and a shaft E. A high-frequency inductor 85 similar to that described with reference to the principal embodiment is shown having a workpiece-receiving opening 86 of a diameter to be closely coupled with the enlarged portions 81 and 82. The concentrator G comprises two semicircular conductor members 87, 88 which, when placed together to form a circle, define a workpiece-receiving opening 89 just slightly greater than the diameter of the small portion 83 of the shaft E. The upper surface of the inductor 85 has a thin layer of insulation 91 thereon. The semicircular segments 87, 88 rest on the top of this insulation 91 and are supported for radial movement relative to the axis of the shaft E. In this embodiment, the concentrator G may ride with the inductor 85 from the lower portion of the shaft E over the small-diameter portion 83 and then over the enlarged portion 82, providing increased coupling for the portion 83 and having little or no effect when the inductor 85 is heating the enlarged portions 81, 82. The segments 87, 88 may be moved radially by any suitable means as the inductor 85 and the concentrator G are progressed axially along the shaft E. In the embodiment shown, the segments 87, 88 have arms 93, 94 respectively fixed at one end of the segment and, at the other end, these arms have dogs 96 which engage in the track 97 of a cam 98, the track 97 of the cam being so shaped as to move the segments 87, 88 into and out of operative relationship with the shaft E as the inductor and the concentrator are progressed along the shaft E. Obviously, other means can be provided for moving the concentrator segment radially relative to the shaft E.

As shown in Figure 10, the segments 87, 88 have their ends in slightly-spaced relationship when they are in operative relationship to concentrate the heating on the smaller-dimensioned portion 83. The current flow in the segments 87, 88 is shown by the arrows in Figure 10. Figure 11 shows the segments 87, 88 in retracted position and out of operative relationship with the inductor 85 when the inductor 85 is heating the large-dimensioned portions 81, 82 of the shaft E.

Figure 8:
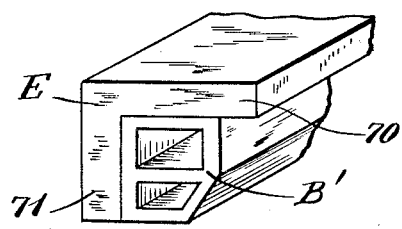

The invention also contemplates the further alternative embodiment that instead of the concentrator D being formed from a C-shaped conductor, it may be comprised of a magnetically-permeable material or a combination of both a C-shaped conductor and magnetically-permeable material. A concentrator formed of a magnetically-permeable material is shown in Figure 8. Here, an inductor B' is shown essentially identical in construction to the inductor of Figure 7. A concentrator E is shown comprised of a stack of thin L-shaped laminations, each formed from a magnetically-permeable material. These laminations are generally L-shaped in plan view and are so disposed, when the concentrator is in operative position with the inductor B', that one leg 70 extends horizontally on radial lines across the upper surface of the inductor B' and the other leg 71 extends vertically down over the outer side of the inductor B'. Each lamination may be pie or wedge shaped or the stack may be otherwise so constructed and arranged so as to be a complete circular stack of laminations. As shown, the upper horizontal leg 70 may extend radially inwardly beyond the wall 35' of the inductor B'. Generally, at the point where the inductor B' picks up the concentrator D, the shaft will have a diameter sufficiently small that this leg 70 may extend an appreciable distance beyond the inner surface of the inductor B'.

If desired, the stack of laminations may be broken up into a plurality of relatively small packets which are positioned progressively along the axis of the shaft at different circumferential positions. With such an arrangement, the inductor B' would pick up one packet at a time to gradually increase its coupling with the shaft A.

The invention has been described with particular reference to a number of different embodiments which applicants have found the invention can take. Obviously, modifications and alterations of the above described embodiments will occur to others upon a reading and understanding of this specification and it is our intention to include all such modifications and alterations insofar as they come within the scope of the appended claims.

Having thus described our invention, we claim:

1. The method of progressively heating a variable-diameter shaft which comprises progressing along said shaft a high-frequency inductor having a fixed workpiece-receiving opening from a large-dimension portion thereof toward a smaller-dimension portion thereof, and at a predetermined point along said progressive movement, moving a concentrator into operative relationship with said inductor to increase the power input of the inductor to the shaft and continuing to progress the inductor and concentrator along said shaft.

2. The method of progressively heating a variable-dimensioned elongated workpiece employing high-frequency induction heating which comprises providing a high-frequency inductor having a workpiece-receiving opening of a diameter generally to provide efficient electrical coupling with a large-dimensioned portion of said workpiece, progressively moving said inductor along said workpiece from a large-diameter portion toward a small-diameter portion whereby the electrical coupling of the inductor to the workpiece decreases and at a predetermined point along said workpiece, moving a concentrator into operative relationship with said inductor to increase the electrical coupling and the power input to the workpiece, and continuing to progress the combined inductor and concentrator along said shaft.

3. In apparatus for progressively heating a metallic workpiece having variable dimensions such that a single high-frequency inductor cannot efficiently electrically couple with the workpiece over the entire length thereof, comprising a workpiece support adapted to support a workpiece in operative relationship, a high-frequency inductor so constructed and arranged as to have efficient electrical coupling with at least one portion of said workpiece, means for progressing said inductor relative to the workpiece whereby the electrical coupling of the inductor to the workpiece will decrease, a concentrator positioned at a predetermined point along the workpiece and supported for movement with said inductor.

4. In high-frequency induction-heating apparatus for heating elongated workpieces having a decreasing cross-sectional dimension from one end towards the other, a workpiece support, a high-frequency inductor, means for energizing said inductor, means for supporting said inductor for relative movement from the large cross-sectional dimensioned end of said workpiece toward the small cross-sectional dimensioned end of said workpiece, a concentrator also movable along the length of said workpiece, said concentrator being positioned intermediate the ends of said workpiece and freely movable toward the small-dimensioned end of said workpiece, said concentrator having means for coacting with means on said inductor for moving along with said inductor when the inductor reaches the position of the concentrator as it is progressed along the workpiece.

5. The combination of claim 4 wherein the concentrator comprises a C-shaped conductor having the ends in close-spaced relationship and having a surface adapted to engage a surface of said inductor, one of said surfaces being formed of an electrical-insulating material.

6. The combination of claim 4 wherein the concentrator comprises a packet of relatively thin laminations formed of magnetic material.

7. In high-frequency induction-heating apparatus for progressively heating elongated workpieces of a gradually tapering diameter, the combination of a high-frequency inductor adapted to be progressed over the length of said workpiece from the large-dimensioned end toward the low-dimensioned end, means for energizing said inductor, means for advancing said inductor along said workpiece, a concentrator ring coaxial with said inductor and adapted to be progressed along said workpiece toward the small-dimensioned end, power means for advancing said concentrator along said workpiece at a rate to maintain the power input to said inductor at a predetermined level.

8. In high-frequency induction-heating apparatus for progressively heating a variable-dimensioned elongated workpiece comprising a pair of spaced workpiece supports, a high-frequency inductor, means for advancing said inductor relatively from one support towards the other, a concentrator aligned with said inductor, power means for advancing said concentrator between said supports in the same direction as said inductor and differential speed-control means for the movement of said inductor and said concentrator to move said concentrator at a rate slower than said inductor so that said concentrator relatively slowly approaches said inductor to maintain the coupling of said inductor with the workpiece at a generally predetermined level as the dimension of the workpiece decreases.

9. In high-frequency induction-heating apparatus, a high-frequency inductor comprising a split loop of a conductor defining a workpiece opening, power leads connecting to said loops on each side of the split, the cross-sectional dimension of said workpiece opening diverging in an upward direction, a concentrator ring adapted to nest in said diverging opening, said concentrator ring comprising a C-shaped split loop of a conductor, the outer sides of said concentrator converging downwardly and having an external dimension to mate with the diverging opening of the inductor and insulating means for separating said surfaces.

10. The combination of claim 9 wherein means are provided for advancing said inductor progressively along a variable-dimensioned elongated workpiece from the large-dimensioned end toward the smaller-dimensioned end and other means for movably supporting said concentrator midway along said workpiece in alignment with said inductor whereby, as said inductor is progressed along the workpiece to the position of the concentrator, the concentrator may then progress along the workpiece with the inductor.

ALFRED C. BODY.
JOHN T. SABOL.

References Cited in the file of this patent
UNITED STATES PATENTS

| Number | Name | Date |
|---|---|---|
| 2,202,758 | Denneen et al. | May 28, 1940 |
| 2,383,992 | Sherman | Sept. 4, 1945 |
| 2,442,968 | Bierwirth | June 8, 1948 |
| 2,456,091 | Stevens et al. | Dec. 14, 1948 |
| 2,481,008 | Gagliardi | Sept. 6, 1949 |
| 2,481,071 | Bowlus | Sept. 6, 1949 |
| 2,485,843 | Pinkney | Oct. 25, 1949 |